No. 894,084. PATENTED JULY 21, 1908.
J. C. THOMAS.
TIRE TREAD CHAIN FOR AUTOMOBILE WHEELS, &c.
APPLICATION FILED MAR. 22, 1907.
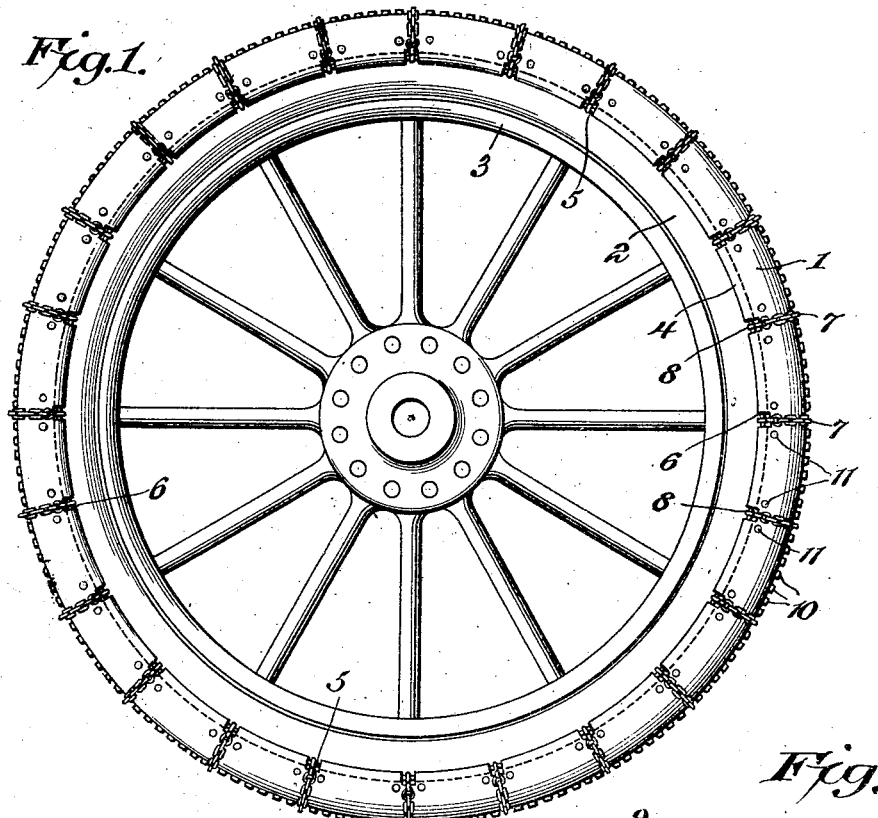
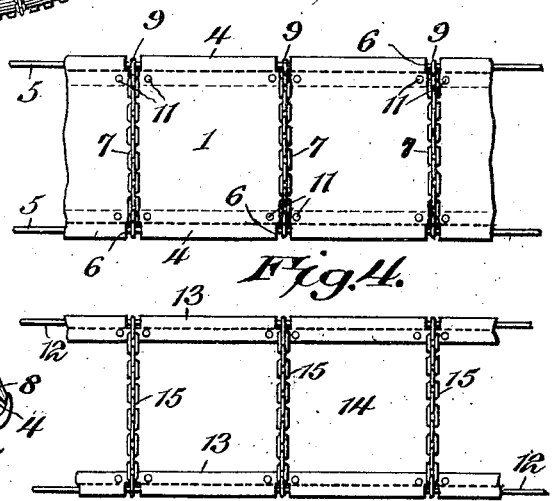
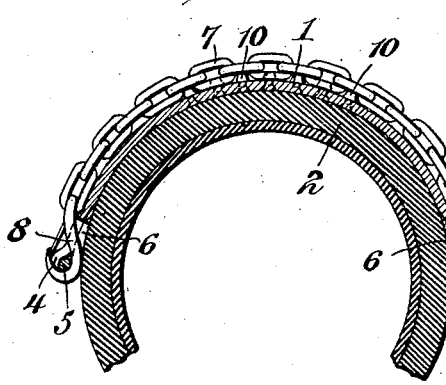
James C. Thomas, Inventor,
Witnesses
By
Attorney

UNITED STATES PATENT OFFICE.

JAMES CLARENCE THOMAS, OF CORSICANA, TEXAS, ASSIGNOR OF ONE-HALF TO FREDERICK W. BARTH, OF CORSICANA, TEXAS.

TIRE-TREAD CHAIN FOR AUTOMOBILE-WHEELS, &c.

No. 894,084.     Specification of Letters Patent.     Patented July 21, 1908.

Application filed March 22, 1907. Serial No. 363,885.

*To all whom it may concern:*

Be it known that I, JAMES CLARENCE THOMAS, a citizen of the United States, residing at Corsicana, in the county of Navarro and State of Texas, have invented a new and useful Tire - Tread Chain for Automobile-Wheels, &c., of which the following is a specification.

The invention relates to improvements in tire tread chains for automobile wheels, and other wheels having pneumatic tires.

The object of the present invention is to improve the construction of tire tread chains, and to provide a simple, inexpensive and efficient device adapted to be readily attached to and removed from a pneumatic tire, and capable of being held thereon by the inflation of the tire and of preventing skidding, punctures and blow-outs.

A further object of the invention is to provide a device of this character adapted to render an automobile, or other vehicle more reliable and safe, and capable of affording greater speed and of protecting the sides of the tire from the wear caused by ruts in a road.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a wheel provided with a tire tread chain, constructed in accordance with this invention. Fig. 2 is a transverse sectional view of the tire tread chain and a portion of the tire. Fig. 3 is a plan view of a portion of a tire tread chain, illustrating a modification of the invention. Fig. 4 is a similar view, showing another form of the invention.

Like numerals of reference designate corresponding parts in all the figures of the drawing.

1 designates a flexible band of leather, or other suitable material arranged on and covering the tread of a pneumatic tire 2 of a wheel 3, and having its side edges turned under and stitched to form side seams 4, in which are secured rings 5. The flexible band extends a sufficient distance inward at each side of the tire to protect the sides thereof from the wear caused by ruts in the road.

The rings 5, which are preferably constructed of steel, may, however, be made of composition, or any other material to prevent rust, and the leather is punched or otherwise cut away at the side edges of the band to provide recesses or openings 6 for exposing the side rings to enable transverse chains 7 to be connected with the same. There are preferably twice as many cross chains as there are spokes in the wheel, and these cross chains, which are arranged on the exterior of the band, are adapted to prevent the wheel from slipping or skidding, and they may be provided at their terminals with snap hooks 8 to enable them to be readily detached, when traveling over roads where the use of the chains is not permitted. The rings may pass through end links 9, as illustrated in Fig. 3 of the drawing, when it is not desired to equip the device with detachable chains. When, however, detachable transverse chains are employed, the band is preferably provided at the center of the tread with a plurality of annular rows of projecting steel studs 10, which are in the form of rivets and which are adapted to prevent the wheel from slipping or skidding. The chains may be readily removed or replaced, when the tire is deflated, and when the tire is inflated, the chains will be securely retained on it.

The links of the chain are solid, and the band is provided at opposite sides with rivets 11, which are arranged in pairs, as clearly shown in Figs. 1, 3 and 4 of the drawing. These rivets 11, which have smooth heads, are located at opposite sides of the cross chains and are adapted to prevent the ends of the chains from slipping sidewise. The ends of the chains are adapted to sink into the flexible band between the spaced rivets 11, and the latter form stops to prevent the ends of the chains from slipping on the rings and injuring the seams at the cut-away portions or openings 6.

In the modification, shown in Fig. 3 of the drawing, the centrally arranged steel studs are omitted, and if desired the central portion of the flexible band may be omitted, as illustrated in Fig. 4 of the drawing. In this form of the invention, the rings 12 are incased in flexible strips 13 of leather, or other suitable material, and the space 14 between the side strips is open. The cross chains 15 extend across the open space and rest directly against the tread of the tire. If the tire should be punctured, it can be ridden flat with this protecting device.

Having thus fully described my invention, what I claim as new and desire to secure by Letters Patent, is:—

1. A device of the class described comprising side rings, a flexible band having side seams in which the rings are incased, said side seams being provided at intervals with recesses or openings to expose the rings, and cross chains connected with the rings at the exposed portions thereof and extending across the outside of the band.

2. A device of the class described comprising spaced side rings, seams of flexible material in which the rings are incased, cross chains connecting the rings, and spaced fastening devices arranged at the seams and located at opposite sides of the cross chains to prevent the ends thereof from slipping sidewise.

3. A device of the class described comprising a flexible band, side rings arranged within the side edges of the band, and chains located on the exterior of the band and extending across the space between and connected at their terminals with the rings.

4. A device of the class described comprising a flexible band having folded side edges, side rings arranged within the folds of the side edges of the band, and chains located on the exterior of the band and extending across the space between the rings and provided with snap hooks engaging the said rings.

In testimony, that I claim the foregoing as my own, I have hereto affixed my signature in the presence of two witnesses.

JAMES CLARENCE THOMAS.

Witnesses:
W. C. GIBSON,
HAROLD TALBOT.